(12) United States Patent
Yang

(10) Patent No.: US 12,111,685 B2
(45) Date of Patent: Oct. 8, 2024

(54) STYLUS RECEIVING APPARATUS EASILY AND EFFECTIVELY IMPLEMENTING RECEIVING AND EJECTION STYLUS

(71) Applicant: HONOR DEVICE CO., LTD., Guangdong (CN)

(72) Inventor: Xiaoning Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/248,708

(22) PCT Filed: Aug. 19, 2022

(86) PCT No.: PCT/CN2022/113754
§ 371 (c)(1),
(2) Date: Apr. 12, 2023

(87) PCT Pub. No.: WO2023/051087
PCT Pub. Date: Apr. 6, 2023

(65) Prior Publication Data
US 2023/0393615 A1    Dec. 7, 2023

(30) Foreign Application Priority Data
Sep. 28, 2021  (CN) .......................... 202111142047.8

(51) Int. Cl.
*G06F 1/16*    (2006.01)
*G06F 3/0354*    (2013.01)

(52) U.S. Cl.
CPC ........ *G06F 1/1607* (2013.01); *G06F 3/03545* (2013.01)

(58) Field of Classification Search
CPC .. G06F 3/033; G06F 3/03542; G06F 3/03545; G06F 1/1607; G06F 3/041;
(Continued)

(56) References Cited

U.S. PATENT DOCUMENTS

2002/0190823 A1* 12/2002 Yap ..................... G06F 3/03545
                                                                    335/205
2013/0002964 A1    1/2013 Kodaira
(Continued)

FOREIGN PATENT DOCUMENTS

CN    201839561 U    5/2011
CN    201938001 U    8/2011
(Continued)

OTHER PUBLICATIONS

Extended European Search Report issued in EP22871046.3, dated Mar. 12, 2024, 5 pages.

*Primary Examiner* — Ke Xiao
*Assistant Examiner* — Nelson Lam

(57) ABSTRACT

This application relates to a stylus receiving apparatus which includes a bracket, an ejection mechanism, a holding assembly, and a sensing assembly. The bracket defines an accommodating space, and the ejection mechanism is disposed in the accommodating space. The holding assembly includes a magnet part and a coil part. The holding assembly generates a first magnetic field when the coil part is powered off; and the holding assembly generates a second magnetic field when the coil part is powered on. The sensing assembly is communicatively connected to the coil part. The coil part is powered off when the sensing assembly senses that the ejection mechanism changes from an unlocked state to a locked state; and the coil part is powered on when the sensing assembly senses that the ejection mechanism changes from the unlocked state to the locked state.

16 Claims, 7 Drawing Sheets

(58) Field of Classification Search
CPC .. G06F 3/0412; G06F 3/0414; G06F 3/04142; G06F 3/04144; G06F 3/0416; G06F 3/042; G06F 3/043; G06F 3/044; G06F 3/045; G06F 3/046; G06F 3/047; G06F 3/048
USPC .................................. 345/156–158, 173–179
See application file for complete search history.

(56) References Cited

U.S. PATENT DOCUMENTS

| | | | | |
|---|---|---|---|---|
| 2014/0049894 | A1* | 2/2014 | Rihn | G06F 1/1616 335/219 |
| 2015/0070119 | A1* | 3/2015 | Rihn | E05C 19/16 335/295 |
| 2015/0156290 | A1 | 6/2015 | Amit et al. | |
| 2016/0109968 | A1* | 4/2016 | Roh | G06F 3/0487 345/173 |
| 2017/0048370 | A1* | 2/2017 | Kim | G06F 3/038 |
| 2018/0053588 | A1* | 2/2018 | Barel | G06F 3/04883 |
| 2020/0201396 | A1* | 6/2020 | Meng | G06F 1/1607 |
| 2020/0209992 | A1 | 7/2020 | Kwak et al. | |
| 2023/0067384 | A1* | 3/2023 | Thome | G06F 1/1643 |
| 2023/0097723 | A1* | 3/2023 | Wen | G06F 1/1607 361/679.02 |
| 2023/0259222 | A1* | 8/2023 | Kim | G06F 3/0346 345/179 |
| 2023/0280787 | A1* | 9/2023 | Zhong | G06F 1/1643 361/600 |

FOREIGN PATENT DOCUMENTS

| | | |
|---|---|---|
| CN | 110825170 A | 2/2020 |
| CN | 112099651 A | 12/2020 |
| CN | 112558790 A | 3/2021 |
| CN | 112987858 A | 6/2021 |
| CN | 214202219 U | 9/2021 |
| CN | 114003138 A | 2/2022 |

\* cited by examiner

STYLUS RECEIVING APPARATUS EASILY AND EFFECTIVELY IMPLEMENTING RECEIVING AND EJECTION STYLUS

CROSS-REFERECNE TO RELATED APPLICATIONS

This application is a national stage of International Application No. PCT/CN2022/113754, filed on Aug. 19, 2022, which claims priority to Chinese Patent Application No. 202111142047.8, filed on Sep. 28, 2021, both of which are incorporated herein by reference in their entireties.

TECHNICAL FIELD

This application relates to the field of electronic devices, and in particular, to a stylus receiving apparatus, a method, and an electronic device.

BACKGROUND

Some electronic devices, such as a mobile phone and a tablet computer, are often used to cooperate with a stylus. A receiving structure used to receive the stylus may be disposed on these electronic devices.

It is known that the solution of a stylus receiving apparatus has a problem of poor hand feeling. The specific performance is as follows:

1. After receiving, a magnetic attraction force of the stylus needs to be strong enough, otherwise, the stylus may easily fall out.

2. When the stylus is to be taken out, the stylus is ejected by relying on an elastic member such as a spring. When the attraction force of the stylus is strong, an elastic force of the elastic member needs to be increased synchronously, otherwise, the stylus will not be ejected.

3. However, when the elastic force of the elastic member increases, a user needs to use a stronger force to complete a corresponding action when the stylus is inserted and ejected. Consequently, hand feeling is relatively hard, and even slight pain is caused, which affects user experience.

SUMMARY

This application provides a stylus receiving apparatus, a method, and an electronic device, to resolve problems of receiving a stylus in an existing electronic device and a relatively poor hand feeling.

According to a first aspect, an embodiment of this application provides a stylus receiving apparatus, including a bracket, an ejection mechanism, a holding assembly, and a sensing assembly. The bracket defines an accommodating space, and the accommodating space has an exit/entrance port for inserting a stylus. The ejection mechanism is disposed in the accommodating space, and the ejection mechanism can be driven to a locked state or an unlocked state by the stylus that is inserted into the accommodating space. In the locked state, the ejection mechanism allows the stylus to be received in the accommodating space. In the unlocked state, the ejection mechanism is capable of ejecting the stylus from the accommodating space. The holding assembly is configured to cooperate with a held element on the stylus, so as to hold the stylus. The holding assembly includes a magnet part and a coil part. The holding assembly generates a first magnetic field when the coil part is powered off. The holding assembly generates a second magnetic field when the coil part is powered on. A holding force exerted by the second magnetic field on the stylus is smaller than a holding force exerted by the first magnetic field on the stylus. The sensing assembly is communicatively connected to the coil part. The sensing assembly senses a state change of the ejection mechanism by sensing movement of the ejection mechanism. The coil part is powered off when the sensing assembly senses that the ejection mechanism changes from an unlocked state to a locked state. The coil part is powered on when the sensing assembly senses that the ejection mechanism changes from the locked state to the unlocked state.

A method for using the stylus receiving apparatus in this embodiment of this application is as follows:

when the stylus needs to be received, the stylus is inserted from the exit/entrance port, so that the stylus drives the ejection mechanism to change from the unlocked state to the locked state, and is received in the accommodating space; and in this process, the sensing assembly senses the state change, and controls the coil part to be in a power-off state, so that the first magnetic field of the holding assembly holds the stylus, so as to prevent the stylus from falling out of the accommodating space; and when the stylus needs to be taken out, the stylus is pressed, so that the stylus drives the ejection mechanism to change from the locked state to the unlocked state; and in this process, the sensing assembly senses the state change, and controls the coil part to be powered on, and a holding force exerted by the second magnetic field of the holding assembly on the stylus is reduced, so that the ejection mechanism easily ejects the stylus from the exit/entrance port.

Therefore, it can be learned that the stylus receiving apparatus in this embodiment of this application has beneficial effects of reliably holding the stylus, pressing and taking out the stylus with less force, better hand feeling, and better user experience.

In a possible implementation, the magnet part is in a shape of an arc ring, and the arc ring has an inner circumferential surface and an outer circumferential surface that are radially opposite, a first axial end surface and a second axial end surface that are axially opposite, and a first arc end surface and a second arc end surface that are archwise opposite. The first axial end surface, the first arc end surface, the second axial end surface, and the second arc end surface are sequentially connected end-to-end to form a closed loop. The coil part is formed by winding a wire around the magnet part along the closed loop, and the coil part can be powered on to generate a magnetic field opposite to a magnetic field of the magnet part.

In this implementation, the holding assembly that integrates a magnet part and a coil part is formed by winding a wire around the magnet part along the closed loop. In the holding assembly formed in this way, a magnetic field distribution when the coil part is powered on and a magnetic field distribution of the magnet part are basically consistent with each other, and it is easy to control the overall magnetic field of the holding assembly through inverse superposition of magnetic fields of the coil part and the magnet part, so as to reliably control a holding force.

In a possible implementation, the coil part is defined between an inner circumferential surface and an outer circumferential surface of the arc ring.

In this implementation, a winding range of the coil part is located between the inner circumferential surface and the outer circumferential surface of the arc ring, so that winding of the coil part does not increase a thickness (that is, spacing between the inner circumferential surface and the outer circumferential surface) of the magnet part, thereby facilitating mounting of the holding assembly and reducing required mounting space.

In a possible implementation, there are a plurality of holding assemblies, and the plurality of holding assemblies are distributed along a circumferential direction, and are enclosed into a ring that communicates with the accommodating space in an axial direction, to allow the stylus to penetrate.

In this implementation, a plurality of holding assemblies are enclosed into a ring, so that the stylus can be held from each direction, thereby improving holding reliability. In addition, the coil part in each direction also generate a corresponding reverse magnetic field when the coil part is powered on, to offset at least a part of a holding force of the magnet part, so as to help eject the stylus.

In a possible implementation, the sensing assembly includes a magnetic member and a Hall element. The magnetic member is disposed in the ejection mechanism, and can be displaced with a change of the ejection mechanism between a locked state and an unlocked state. The Hall element and the bracket are relatively fastened, and can sense displacement of the magnetic member.

In this implementation, a state change of the ejection mechanism is determined based on movement that is of the magnetic element with the ejection mechanism and that is sensed by the Hall element, and the coil part is controlled to be powered on or powered off, so that the stylus can be easily held firmly when being received, and a holding force when the stylus is ejected can be easily reduced.

In a possible implementation, the stylus receiving apparatus further includes a power supply apparatus, configured to supply power to the coil part and/or the sensing assembly. A power supply mode of the power supply apparatus is battery power supply or wireless power supply.

In this implementation, power supply can be implemented by additionally providing a battery for the stylus receiving apparatus or in a wireless manner (for example, a primary power supply that may come from an electronic device), so as to supply power to each power consumption structure of the apparatus.

In a possible implementation, the bracket includes a seat frame and a cover, and the cover is detachably connected to the seat frame, to enclose into the accommodating space; and when the cover is detached from the seat frame, the accommodating space is opened.

In this implementation, the detachable seat frame and the detachable cover are disposed, so as to facilitate operations such as disassembly/assembly and replacement of an internal structure of the bracket.

In a possible implementation, there are two holding assemblies, and both are in a shape of a semicircular ring; and one of the two holding assemblies is connected to the seat frame, and the other is connected to the cover; and when the cover and the seat frame are combined, the two holding assemblies are enclosed into a ring that communicates with the accommodating space in an axial direction, to allow the stylus to penetrate.

In this implementation, the two holding assemblies are separately mounted on the seat frame and the cover, and are enclosed into a ring that communicates with the accommodating space, to allow the stylus to penetrate, and enable the stylus to be held from two sides.

In a possible implementation, the ejection mechanism includes a sliding seat, a sliding member, an elastic member, and a guide rod. The sliding seat is fixedly connected to the bracket and is located in the accommodating space. The sliding member may slidably cooperate with the sliding seat, and a sliding direction is along an axial direction of the accommodating space; and the sliding member includes a guide plate with a guide groove. The elastic member is elastically supported between the sliding seat and the sliding member, and can exert an elastic force on the sliding member in a direction toward the exit/entrance port. The guide rod includes a fastened end and a movable end. The fastened end and the sliding seat are relatively fastened. The movable end can movably cooperate with the guide groove, and can move along the guide groove when the sliding member is driven by the stylus to move relative to the sliding seat. The guide groove includes a first locked position and a second locked position that are spaced along the axial direction of the accommodating space. In the locked state, the movable end is located in the first locked position, and the guide rod pulls the sliding member, so that the sliding member is limited to a position that is relatively far away from the exit/entrance port, and compresses the elastic member. In the unlocked state, the movable end is located in the second locked position, and the sliding member is ejected by the elastic member to a position closer to the exit/entrance port.

This implementation provides a specific ejection mechanism. The ejection mechanism can be locked to allow a stylus to be received and held, and the stylus is ejected by using the elastic member of the ejection mechanism.

In a possible implementation, the sliding member further includes a sleeve, and the sleeve is connected to an end of the guide plate near the exit/entrance port, and is configured to adapt the stylus.

In this implementation, the sleeve is disposed to be connected to the guide plate, so that the stylus easily transmits force to the guide plate through the sleeve, so as to drive the guide plate to move.

In a possible implementation, there is a step surface between the guide plate and the sleeve, the elastic member is a helical spring, and the elastic member is sleeved outside the guide plate, and an end of the elastic member abuts against the step surface.

In this implementation, the elastic member abuts against the step surface and is sleeved outside the guide plate, thereby reducing an overall length of the ejection mechanism.

In a possible implementation, a mounting groove is disposed on the sleeve. The sensing assembly includes a magnetic member and a Hall element, and the magnetic member is disposed in the mounting groove. The Hall element and the bracket are relatively fastened, and can sense displacement of the magnetic member.

In this implementation, the mounting groove is disposed on the sleeve to accommodate the magnetic member, and a state change of the ejection mechanism is obtained based on movement of the magnetic member with the sleeve and sensing of the Hall element. A structure is simple, and implementation is easy.

In a possible implementation, the accommodating space of the bracket includes a positioning ring groove that is spaced along an axial direction, a corresponding ring-shaped protrusion is disposed on an outer circumferential surface of the sliding seat, and the ring-shaped protrusion is adapted to a corresponding positioning groove. A connection convex lug is further disposed on a side surface of the sliding seat, and the sliding seat is fixedly connected to the bracket by using the connection convex lug.

In this implementation, positioning and mounting of the sliding seat can be easily implemented through cooperation between the positioning ring groove and the ring-shaped protrusion and connection of the connection convex lug.

According to a second aspect, an embodiment of this application provides a stylus receiving method. Based on the foregoing stylus receiving apparatus, the stylus receiving method includes:

when a stylus needs to be received, inserting the stylus from the exit/entrance port, so that the stylus drives an ejection mechanism to change from an unlocked state to a locked state, and is received in an accommodating space; in addition, controlling a coil part to be in a power-off state, so that a first magnetic field of a holding assembly holds the stylus; and when the stylus needs to be taken out, pressing the stylus, so that the stylus drives the ejection mechanism to change from the locked state to the unlocked state; in addition, controlling the coil part to be powered on, so that the holding assembly generates a second magnetic field, and the ejection mechanism easily ejects the stylus from the exit/entrance port.

The stylus receiving method in this embodiment of this application is based on the foregoing stylus receiving apparatus, which can easily and effectively implement receiving and ejection of the stylus, ensure good hand feeling, and improve user experience.

In a possible implementation, a control system receives a state change of the ejection mechanism that is sensed by the sensing assembly, and controls, based on the corresponding state change, the coil part to be powered on or powered off.

The control system in this implementation may be a main control system of an electronic device in which the stylus receiving apparatus is used. That is, the control of the stylus receiving apparatus for receiving a signal of the sensing assembly and controlling the coil part to be powered on/powered off is implemented by the main control system of the electronic device.

According to a third aspect, an embodiment of this application provides an electronic device, including a stylus and a device body. A held element is disposed on the stylus. The device body includes the foregoing stylus receiving apparatus, and the holding assembly can hold the held element.

According to the electronic device in this embodiment of this application, the device body of the electronic device uses the foregoing stylus receiving apparatus to receive the stylus, so that the stylus can be easily received and ejected, and good hand feeling can be ensured.

In a possible implementation, the electronic device further includes a device power supply, configured to supply power to the coil part and/or the sensing assembly in a wired or wireless manner.

In this implementation, the electronic device can supply power to the coil part and/or the sensing assembly by using the device power supply in a wireless or wired manner, so as to implement various functions of the stylus receiving apparatus.

BRIEF DESCRIPTION OF DRAWINGS

To describe technical solutions in embodiments of this application more clearly, the following briefly describes accompanying drawings in embodiments. It should be understood that the following accompanying drawings show only some embodiments of this application. Therefore, the following accompanying drawings should not be considered as a limitation on a scope. A person of ordinary skill in the art may still derive other related drawings from these accompanying drawings without creative efforts.

REFERENCE NUMERALS OF MAIN COMPONENTS

Figure 1:
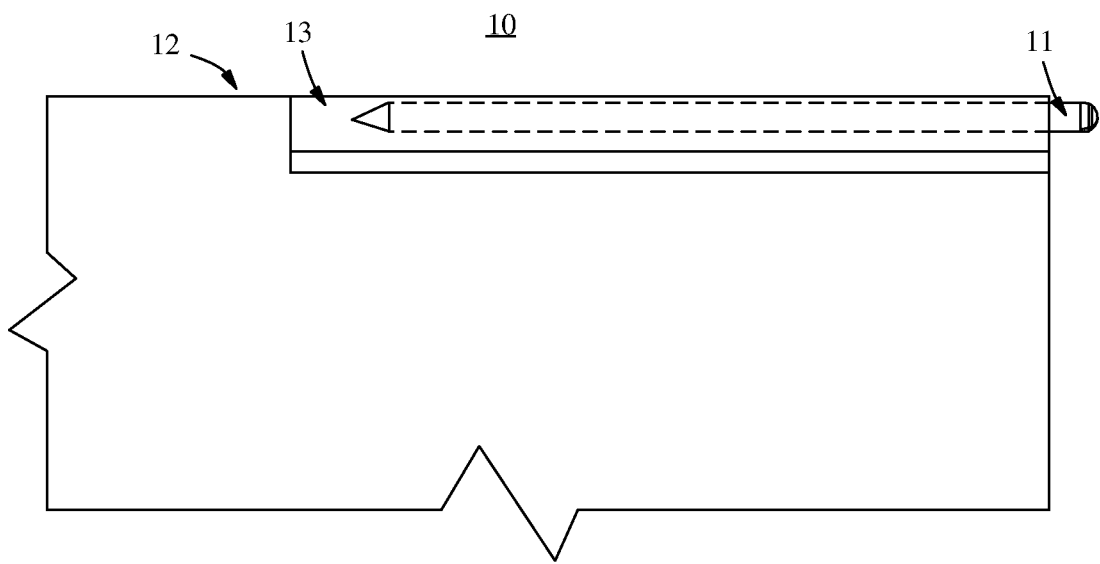
FIG. 1 is a schematic diagram of a structure of an electronic device according to an embodiment of this application.

Electronic device 10
Stylus 11
Device body 12
Stylus receiving apparatus 13
Bracket 14
Ejection mechanism 15
Holding assembly 16
Sensing assembly 17
Accommodating space 18
Exit/Entrance port 19
Magnet part 20
Coil part 21
Seat frame 22
Cover 23
Connection lug 24
Sliding seat 25
Sliding member 26
Elastic member 27
Guide rod 28
Guide groove 29
Guide plate 30
Fastened end 31
Movable end 32
First locked position 33
Second locked position 34
Sleeve 35
Cooperating hole 36
Step surface 37
Positioning ring groove 38
Ring-shaped protrusion 39
Connection convex lug 40
Screw 41
Magnetic member 42
Hall element 43
Mounting groove 44

Lead 45
Inner hole 46
Inner circumferential surface 47
Outer circumferential surface 48
First axial end surface 49
Second axial end surface 50
First arc end surface 51
Second arc end surface 52
Power supply apparatus 53
Control switch 54
Control system 55
Held element 56
Guide groove 57
Guide convex bar 58

DESCRIPTION OF EMBODIMENTS

The following clearly describes technical solutions in embodiments of this application with reference to accompanying drawings in embodiments of this application. Apparently, the described embodiments are only some embodiments rather than all of embodiments of this application.

It should be noted that when an element is referred to as being "fastened" to another element, it may be directly on another element, or a centered element may exist. When one element is considered to be "connected to" another element, it may be directly connected to another element, or a centered element may exist at the same time. When one element is considered to be "disposed" on another element, it may be directly disposed on another element, or a centered element may exist at the same time. The terms "vertical", "horizontal", "left", "right", and similar expressions are used herein for illustrative purposes only.

Unless otherwise defined, all technical and scientific terms used in this specification have the same meaning as those commonly understood by a person skilled in the art of this application. The terms used in the specification of this application are merely intended to describe specific implementations, and are not intended to limit this application. The term "or/and" used in the specification includes any and all combinations of one or more associated listed items.

Some implementations of this application are described in detail. If there is no conflict, the following implementations and the features in the implementations may be mutually combined.

EMBODIMENT

Figure 2:
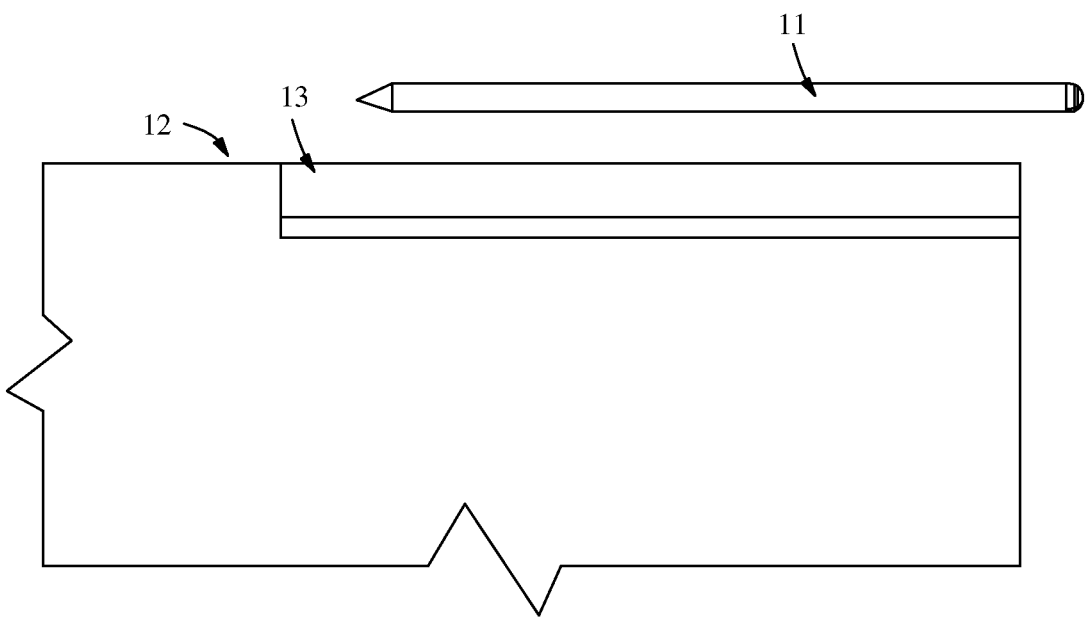
FIG. 2 is a schematic diagram of the electronic device in FIG. 1 after a stylus is taken out.
Figure 3:
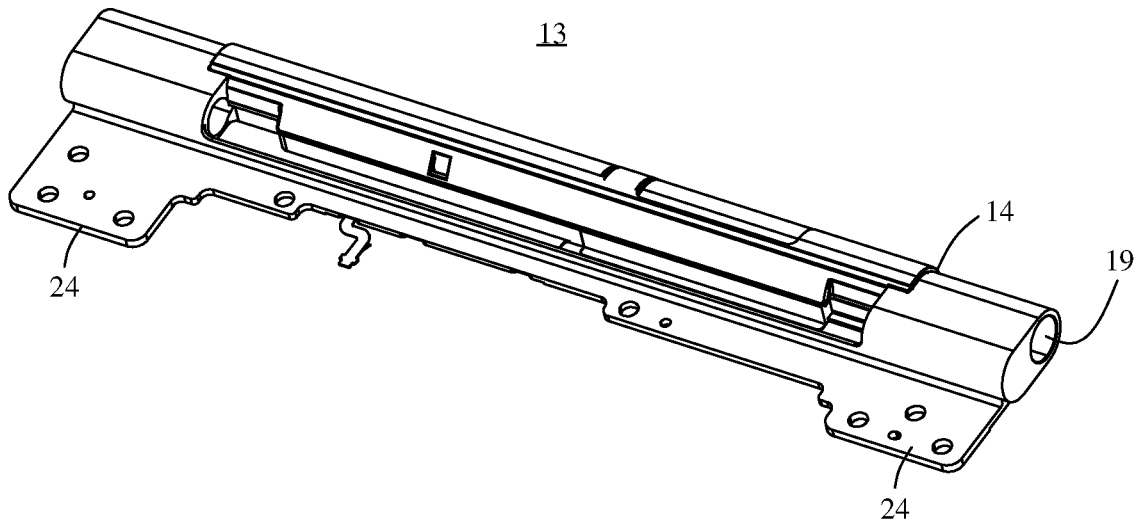
FIG. 3 is a three-dimensional view of a stylus receiving apparatus according to an embodiment of this application.

Referring to FIG. 1, this embodiment provides an electronic device 10, including a stylus 11 and a device body 12. The device body 12 includes a stylus receiving apparatus 13, configured to receive the stylus 11. When the stylus 11 needs to be used, the stylus 11 may be taken out of the stylus receiving apparatus 13, as shown in FIG. 2.

The electronic device 10 in this embodiment may be a mobile phone, a laptop computer, a tablet computer, a laptop computer accessory, a tablet computer accessory, and a mobile phone accessory and another device that needs a stylus receiving function.

The stylus receiving apparatus 13 may be disposed integrally in the electronic device 10 as a part of the device body 12. Alternatively, the apparatus may be an independent product, and may be detachably attached, by using a connection structure, to the device body 12 that has no stylus receiving function for use.

Figure 8:
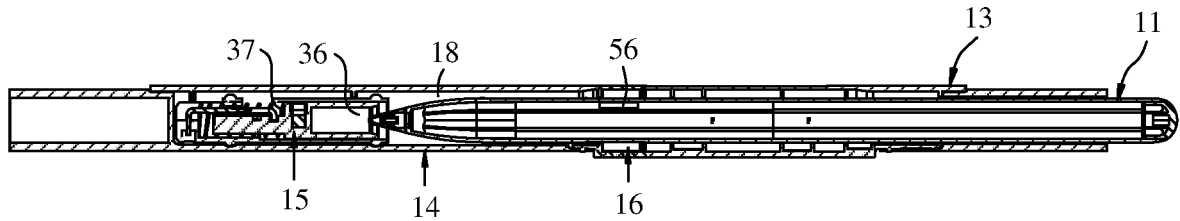
FIG. 8 is a sectional view taken along a line A-A in FIG. 7.

Referring to FIG. 3 to FIG. 8 together, this embodiment of this application provides a stylus receiving apparatus 13, including a bracket 14, an ejection mechanism 15, a holding assembly 16, and a sensing assembly 17. Referring mainly to FIG. 8, the bracket 14 defines an accommodating space 18, and the accommodating space 18 is provided with an exit/entrance port 19 for inserting the stylus 11. For the bar-shaped stylus 11, the accommodating space 18 is approximately a bar-shaped groove hole structure in which the exit/entrance port 19 is disposed at an end, and a cross-section adapts the stylus 11, for example, is disposed as a square or a circle. The ejection mechanism 15 is disposed in the accommodating space 18, and the ejection mechanism 15 can be driven to a locked state or an unlocked state by the stylus 11 that is inserted into the accommodating space 18. In the locked state, the ejection mechanism 15 allows the stylus 11 to be received in the accommodating space 18. In the unlocked state, the ejection mechanism 15 is capable of ejecting the stylus 11 from the accommodating space 18 (a feasible implementation in which the ejection mechanism 15 implements the locked state and the unlocked state is described below). The holding assembly 16 is configured to cooperate with the held element 56 (such as a magnet) on the stylus 11, so as to hold the stylus 11. The holding assembly 16 includes a magnet part 20 and a coil part 21. The holding assembly 16 generates a first magnetic field when the coil part 21 is powered off. The holding assembly 16 generates a second magnetic field when the coil part 21 is powered on. A holding force exerted by the second magnetic field on the stylus 11 is smaller than a holding force exerted by the first magnetic field on the stylus 11. The sensing assembly 17 is communicatively connected to the coil part 21. The sensing assembly 17 senses a state change of the ejection mechanism 15 by sensing movement of the ejection mechanism 15. When the sensing assembly 17 senses that the ejection mechanism 15 changes from an unlocked state to a locked state, the coil part 21 is powered off. When the sensing assembly 17 senses that the ejection mechanism 15 changes from the locked state to the unlocked state, the coil part 21 is powered on.

A method for using the stylus receiving apparatus 13 in this embodiment of this application is as follows:

when the stylus 11 needs to be received, the stylus 11 is inserted from the exit/entrance port 19, so that the stylus 11 drives the ejection mechanism 15 to change from the unlocked state to the locked state, and is received in the accommodating space 18; and in this process, the sensing assembly 17 senses the state change, and controls the coil part 21 to be in a power-off state, so that the first magnetic field of the holding assembly 16 holds the stylus 11, so as to prevent the stylus 11 from falling out of the accommodating space 18; and when the stylus 11 needs to be taken out, the stylus 11 is pressed, so that the stylus 11 drives the ejection mechanism 15 to change from the locked state to the unlocked state; and in this process, the sensing assembly 17 senses the state change, and controls the coil part 21 to be powered on, and a holding force exerted by the second magnetic field of the holding assembly 16 on the stylus 11 is reduced, so that the ejection mechanism 15 easily ejects the stylus 11 from the exit/entrance port 19 with a relatively small elastic force.

Therefore, it can be learned that the stylus receiving apparatus 13 in this embodiment of this application has beneficial effects of reliably holding the stylus 11, pressing and taking out the stylus 11 with less force, better hand feeling, and better user experience.

Figure 4:
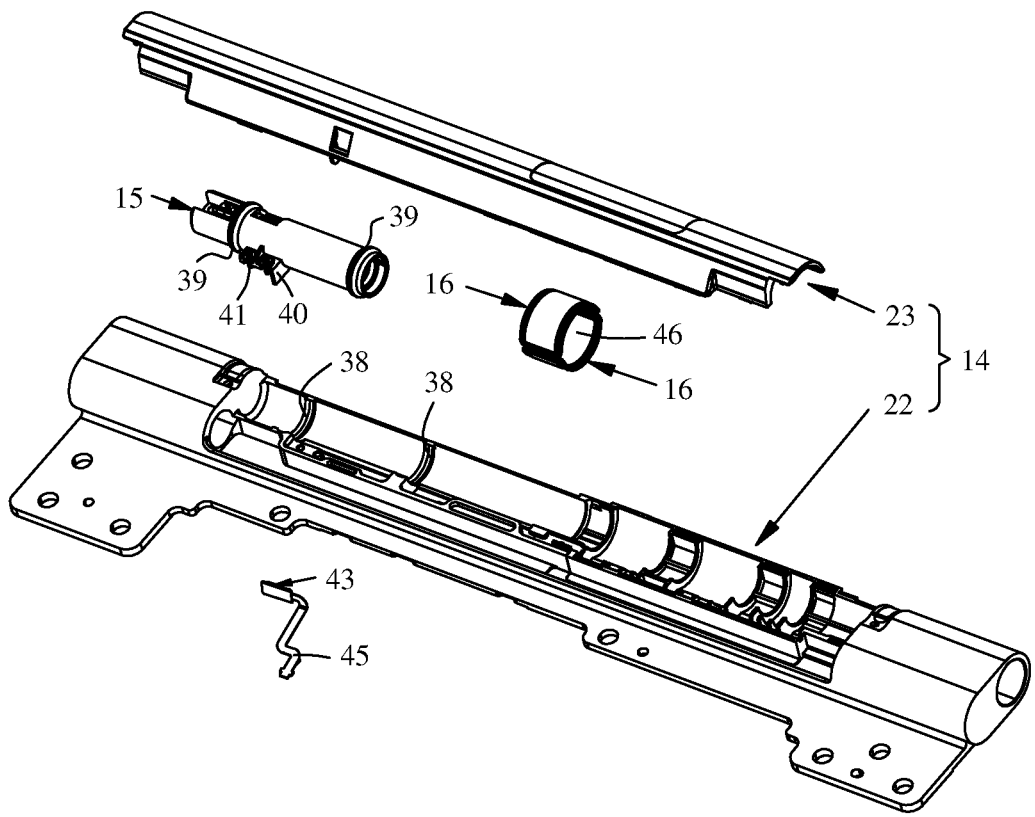
FIG. 4 is an expanded view of the stylus receiving apparatus in FIG. 3.

Referring mainly to FIG. 4, in this implementation, the bracket 14 includes a seat frame 22 and a cover 23, and the cover 23 is detachably connected to the seat frame 22, so as to enclose into the accommodating space 18. When the cover 23 is detached from the seat frame 22, the accommodating space 18 is opened. In this implementation, the detachable seat frame 22 and the detachable cover 23 are disposed, so as to facilitate operations such as disassembly/assembly and replacement of an internal structure (such as an ejection assembly) of the bracket 14. A connection manner between the cover 23 and the seat frame 22 may be clamping, or a connection is implemented by using a screw. In this embodiment, the seat frame 22 may be include a connection lug 24, configured to implement a connection to another part of the device body 12.

Figure 9:
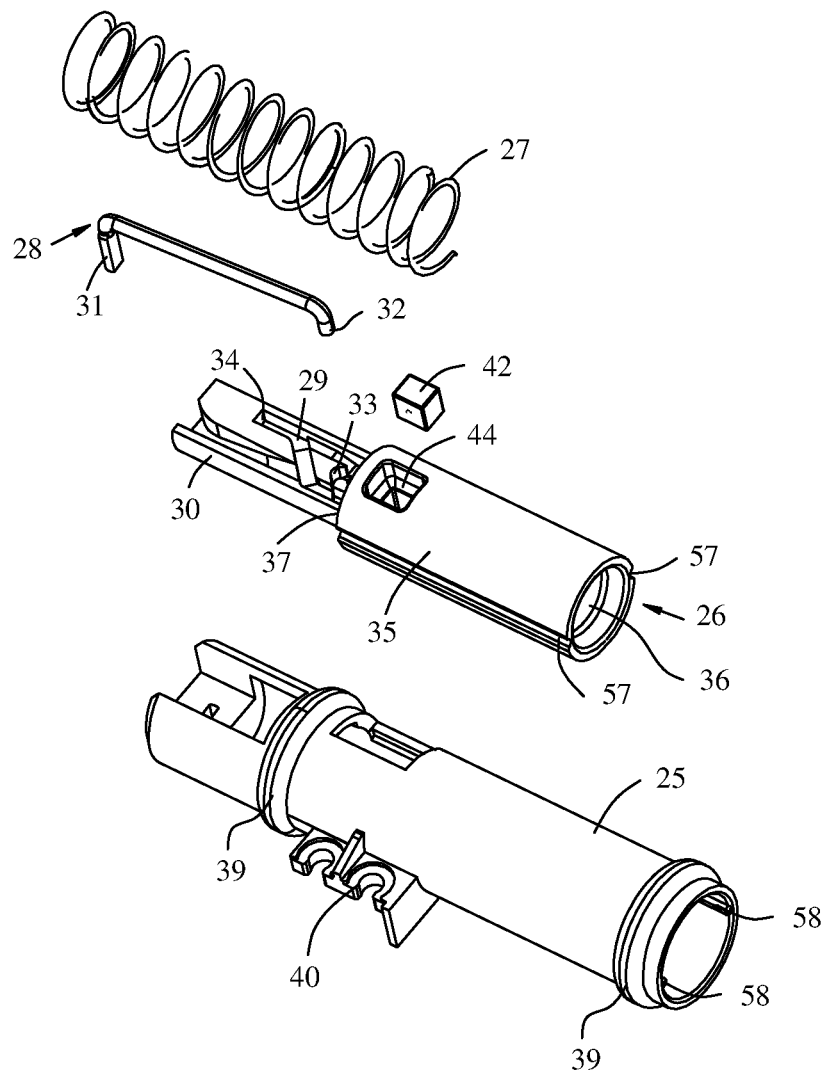
FIG. 9 is an expanded view of an ejection mechanism in the stylus receiving apparatus shown in FIG. 4.

The ejection mechanism 15 in this embodiment of this application may be implemented in a plurality of forms. For example, referring to FIG. 9 together, in this implementation, the ejection mechanism 15 includes a sliding seat 25, a sliding member 26, an elastic member 27, and a guide rod 28. The sliding seat 25 is fixedly connected to the bracket 14, and is located in the accommodating space 18. The sliding member 26 may slidably cooperate with the sliding seat 25, and a sliding direction is along an axial direction of the accommodating space 18; and the sliding member 26 includes a guide plate 30 with a guide groove 29. The elastic member 27 is elastically supported between the sliding seat 25 and the sliding member 26, and can exert an elastic force on the sliding member 26 in a direction toward the exit/entrance port 19. The guide rod 28 includes a fastened end 31 and a movable end 32. The fastened end 31 and the sliding seat 25 are relatively fastened. The movable end 32 can movably cooperate with the guide groove 29, and can move along the guide groove 29 when the sliding member 26 is driven by the stylus 11 to move relative to the sliding seat 25. The guide groove 29 includes a first locked position 33 and a second locked position 34 that are spaced along an axial direction of the accommodating space 18, and the guide groove 29 can guide the guide rod 28 to move in a one-way cycle within the guide groove 29. A movement path passes through the first locked position 33 and the second locked position 34. For a specific implementation, refer to an arrangement manner of a common Push-Push mechanism. In the locked state, the movable end 32 is located in the first locked position 33, and the guide rod 28 pulls the sliding member 26, so that the sliding member 26 is limited to a position that is relatively far away from the exit/entrance port 19, and compresses the elastic member 27. In the unlocked state, the movable end 32 is located in the second locked position 34, and the sliding member 26 is ejected by the elastic member 27 to a position closer to the exit/entrance port 19. This implementation provides an ejection mechanism 15 that can be locked and unlocked by using the Push-Push mechanism. The ejection mechanism 15 can be easily locked to allow the stylus 11 to be received and held, and the stylus 11 is ejected by using the elastic member 27 of the ejection mechanism 15. Optionally, the sliding member 26 further includes a sleeve 35, and the sleeve 35 is connected to an end of the guide plate 30 near the exit/entrance port 19, and is configured to adapt the stylus 11. For example, a cooperating hole 36 is disposed on an end of the sleeve 35 facing the stylus 11, and an outer end of the cooperating hole 36 is a cone adapted to the end of the stylus 11. In this implementation, the sleeve 35 is disposed to be connected to the guide plate 30, so that the stylus 11 easily transmits force to the guide plate 30 through the sleeve 35, so as to drive the guide plate 30 to move. Optionally, there is a step surface 37 between the guide plate 30 and the sleeve 35, the elastic member 27 is a helical spring, and the elastic member 27 is sleeved outside the guide plate 30, and an end of the elastic member 27 abuts against the step surface 37. Optionally, the elastic member 27 abuts against the step surface 37, and is disposed outside the guide plate 30. In this arrangement manner, the elastic member 27 overlaps with the guide plate 30 in a longitudinal direction, thereby reducing an overall length of the ejection mechanism 15.

In this implementation, optionally, a guide groove 57 parallel to an axial direction of the sleeve 35 is disposed on an outer circumference of the sleeve 35, and a guide convex bar 58 corresponding to the guide groove 57 is disposed on an inner circumference of the sliding seat 25, so as to implement sliding cooperation between the sleeve 35 and the sliding seat 25 through between the guide groove 57 and the guide convex bar 58, and limit relative rotation of the sleeve 35 and the sliding seat 25 in a circumferential direction.

In this implementation, optionally, the accommodating space 18 of the bracket 14 includes a positioning ring groove 38 that is spaced along an axial direction, a corresponding ring-shaped protrusion 39 is disposed on an outer circumferential surface 48 of the sliding seat 25, and the ring-shaped protrusion 39 is adapted to the corresponding positioning groove. A connection convex lug 40 is further disposed on a side surface of the sliding seat 25, and the sliding seat 25 is connected to the bracket 14 by using the connection convex lug 40 that is fastened by a screw 41. In this implementation, positioning and mounting of the sliding seat 25 can be easily implemented through cooperation between the positioning ring groove 38 and the ring-shaped protrusion 39 and connection of the connection convex lug 40. For the bracket 14 disposed as the seat frame 22 and the cover 23, grooves may be separately opened on the seat frame 22 and the cover 23, so that the seat frame 22 and the cover 23 are enclosed, in a combined state, into the foregoing positioning ring groove 38. In another implementation, the sliding seat 25 may be disposed integrally on the bracket 14, so as to implement relatively fixed connection between the sliding seat 25 and the bracket 14.

Figure 5:
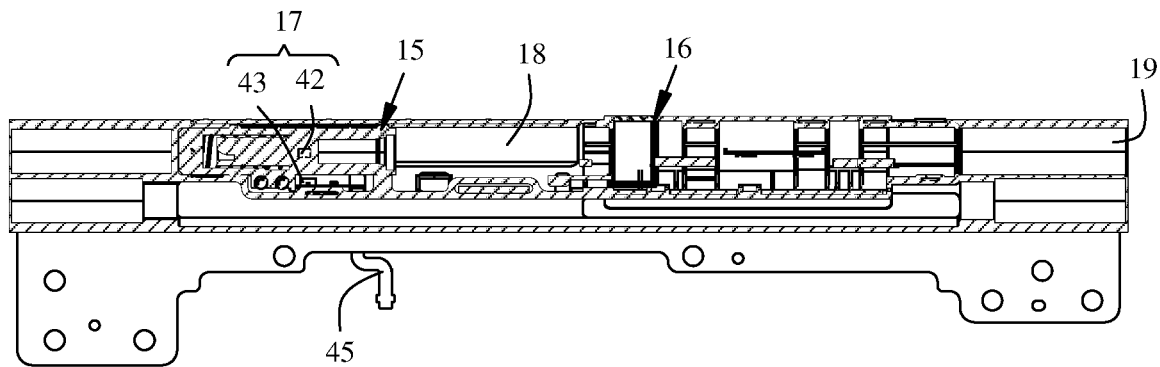
FIG. 5 is a sectional view of the stylus receiving apparatus in FIG. 3.
Figure 6:
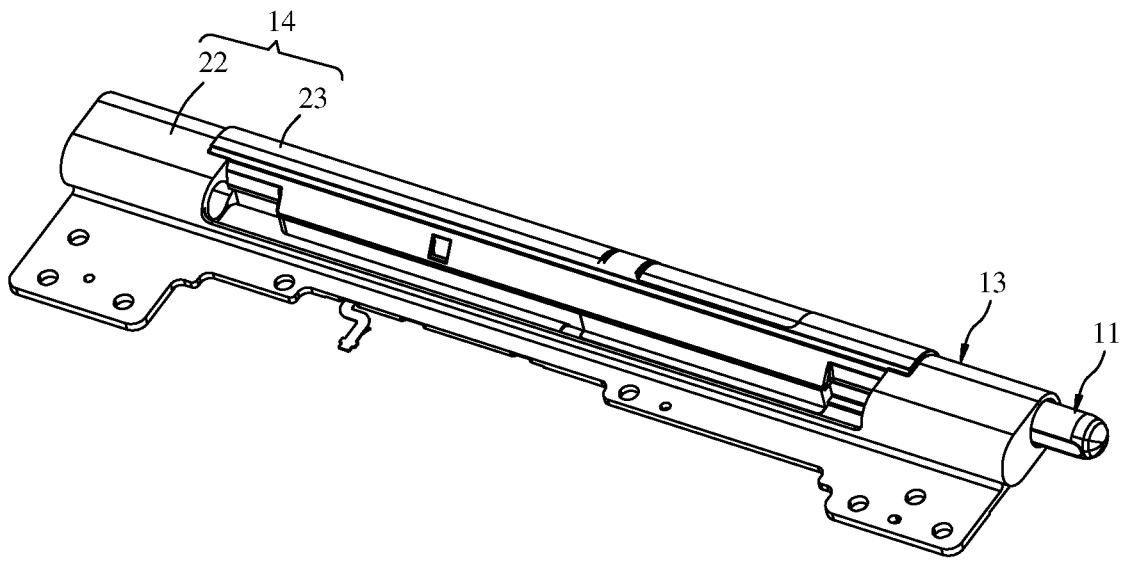
FIG. 6 is a diagram showing cooperation between the stylus receiving apparatus in FIG. 3 and a stylus.
Figure 7:
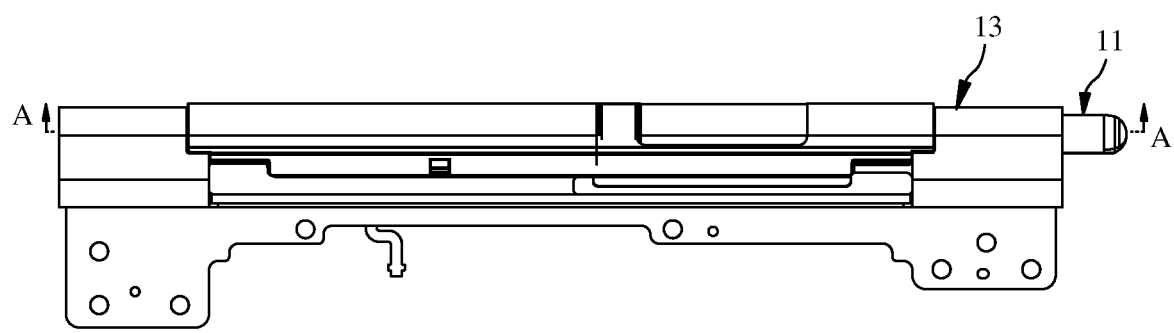
FIG. 7 is a top view of FIG. 6.

Referring to FIG. 4 and FIG. 5 together, in this embodiment, the sensing assembly 17 includes a magnetic member 42 and a Hall element 43. The magnetic member 42 is disposed in the ejection mechanism 15, and can be displaced with a change of the ejection mechanism 15 between a locked state and an unlocked state. The Hall element 43 and the bracket 14 are relatively fastened, and can sense displacement of the magnetic member 42. In this implementation, a state change of the ejection mechanism 15 is determined based on movement that is of the magnetic element 42 with the ejection mechanism 15 and that is sensed by the Hall element 43, and the coil part 21 is controlled to be powered on or powered off, so that the stylus 11 can be easily held firmly when being received, and a holding force when the stylus 11 is ejected can be easily reduced. In this implementation, optionally, a mounting groove 44 is disposed on the sleeve 35, and the magnetic member 42 is disposed in the mounting groove 44. The Hall element 43 and the bracket 14 are relatively fastened, and correspond to the magnetic member 42, so as to sense displacement of the magnetic member 42. In this implementation, the mounting groove 44 is disposed on the sleeve 35 to accommodate the magnetic member 42, and a state change of the ejection mechanism 15 is obtained based on movement of the magnetic member 42 with the sleeve 35 and sensing of the Hall element 43. A structure is simple, and implementation is easy. The Hall element 43 may be disposed in the accommodating space 18, and enters a main control system of the electronic device 10 in a manner in which a lead 45 passes through the bracket 14 to outside of the accommodating space 18.

Figure 10:
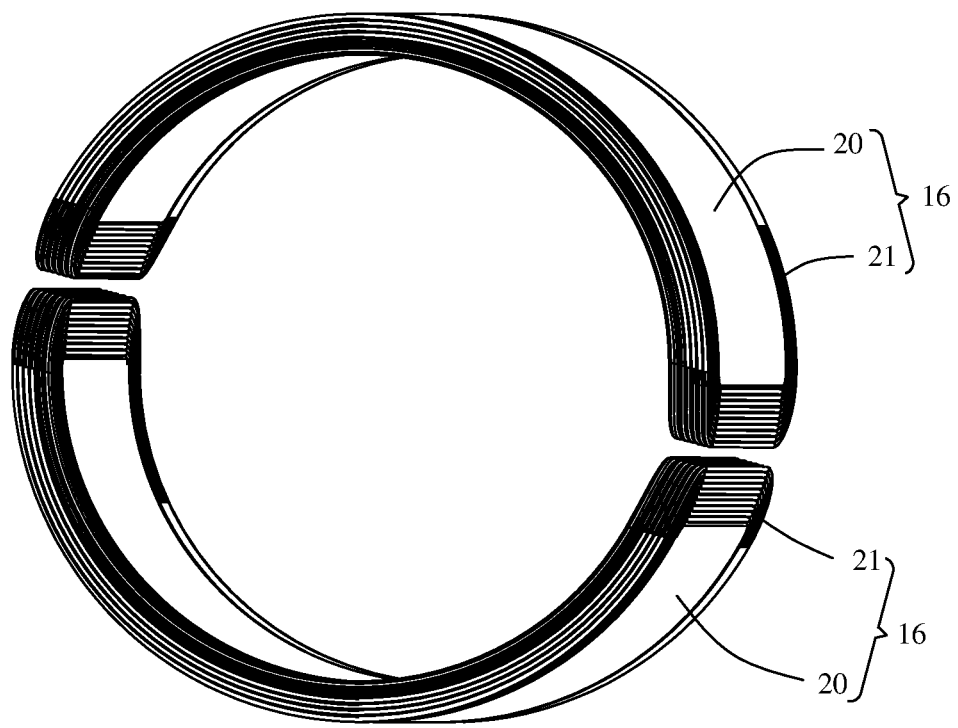
FIG. 10 is a perspective view of a holding assembly in the stylus receiving apparatus shown in FIG. 4.
Figure 11:
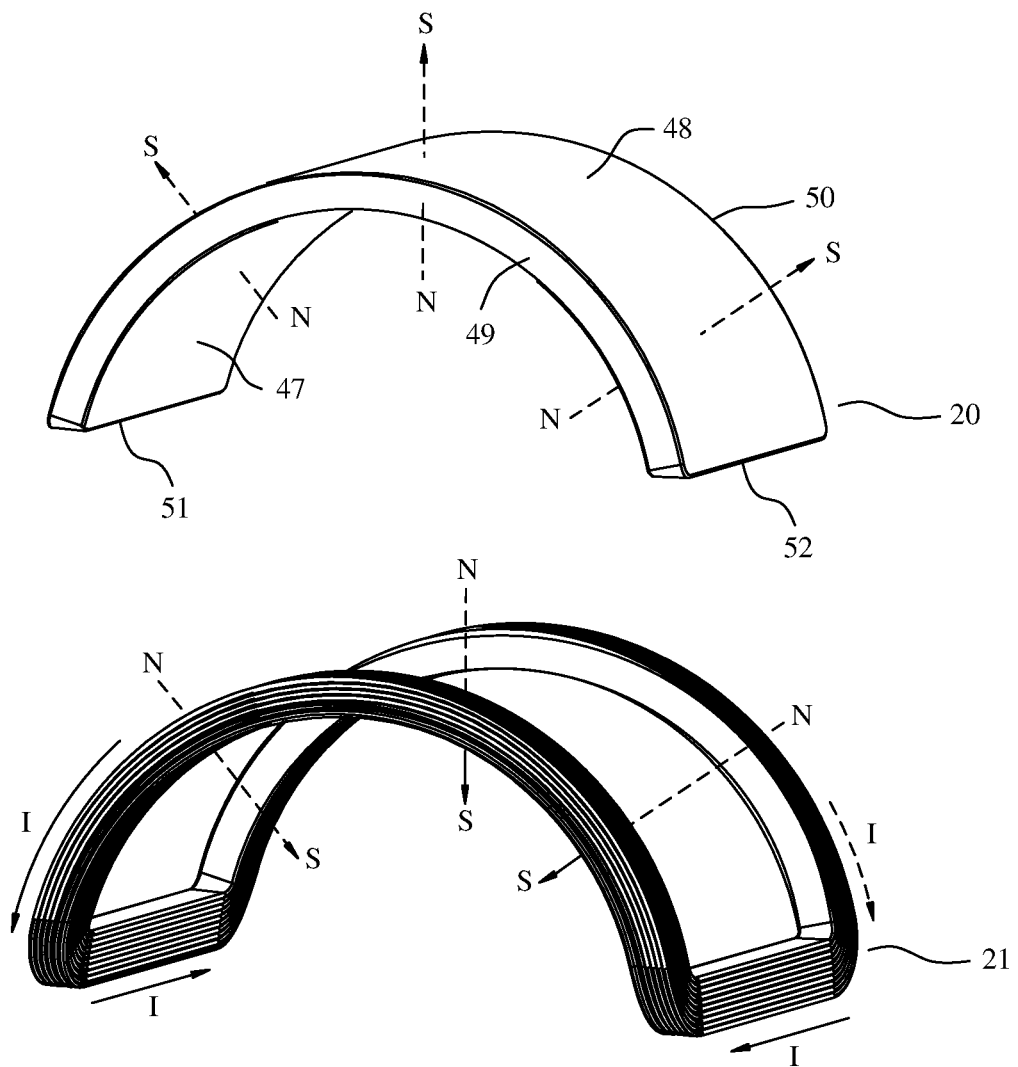
FIG. 11 is an exploded view of the holding assembly in FIG. 10.

Referring to FIG. 10, FIG. 11, and FIG. 4 together, there are a plurality of holding assemblies 16 in this embodiment, and the plurality of holding assemblies 16 are distributed along a circumferential direction, and are enclosed into a ring that communicates with the accommodating space 18 in an axial direction. As shown in the figures, there are two holding assemblies 16, and the two holding assemblies 16 are approximately in a shape of a semicircular ring, so that the two holding assemblies 16 can be enclosed into an approximately complete ring, and an inner hole 46 enclosed by the two holding assemblies may allow the stylus 11 to penetrate. In this implementation, a plurality of holding assemblies 16 are enclosed into a ring, so that the stylus 11 can be held from each direction, thereby improving holding reliability. In addition, the coil part 21 in each direction also generate a corresponding reverse magnetic field when the coil part is powered on, to offset at least a part of a holding force of the magnet part 20, so as to help eject the stylus 11. In other words, the held element 56 of the stylus 11 is disposed at any position in the circumferential direction of the stylus 11, and can be held by a part of the holding assembly 16 on the side, so that the stylus 11 can be easily inserted and held at any angle.

Referring mainly to FIG. 11, in this implementation, the magnet part 20 is in a shape of an arc ring, that is, a structure of a ring that extends only in a circumferential direction, for example, a structure of a semicircular ring. The magnet part 20 in a shape of an arc ring has an inner circumferential surface 47 and an outer circumferential surface 48 that are radially opposite, a first axial end surface 49 and a second axial end surface 50 that are axially opposite, and a first arc end surface 51 and a second arc end surface 52 that are archwise opposite. The first axial end surface 49, the first arc end surface 51, the second axial end surface 50, and the second arc end surface 52 are sequentially connected end-to-end to form a closed loop. Referring to FIG. 10 and FIG. 11 together, the coil part 21 is formed by winding a wire around the magnet part 20 along the closed loop, and the coil part 21 can be powered on to generate a magnetic field opposite to a magnetic field of the magnet part 20. As shown in FIG. 11, the magnet part 20 may be made of a permanent magnet. The magnet part 20 has a magnetic field along a radial direction, and the radially inner side is the N pole, the radially outer side is the S pole. Correspondingly, after the coil part 21 is powered on in the current direction I shown in the figure, a magnetic field is generated in the radial direction inside the space enclosed by the coil part 21, and the radially inner side is the S pole, the radially outer side is the N pole. In this way, when the coil part 21 is not powered on, a first magnetic field generated by the holding assembly 16 is mainly represented as a magnetic field generated by the magnet part 20; and when the stylus 11 is received in the accommodating space 18, the N pole of the held element 56 of the stylus 11 corresponds to the holding assembly 16, so that the stylus 11 is reliably held on the holding assembly 16 and cannot easily fall out. After the coil part 21 is powered on in the current direction I shown in the figure, a second magnetic field generated by the holding assembly 16 is mainly represented as a magnetic field generated by the magnet part 20 and a superposed magnetic field generated by the coil part 21; and the magnetic field generated by the coil part 21 is mainly located on an inner side of the coil part 21, namely, a region in which the magnet part 20 is located, and the magnetic field generated by the coil part 21 is opposite to the magnetic field generated by the magnet part 20, so that the effects of the two magnetic fields are offset, thereby reducing the holding force for the stylus 11. Certainly, a magnitude of a magnetic field of the coil part 21 may be controlled based on a magnitude of a powered-on current. Generally, a current can be controlled, so that a magnetic field generated by the coil part 21 is equal to that of the magnet part 20, and the two are offset, and only the holding force needs to be reduced.

In this implementation, the wire used for winding into the coil part 21 may be a copper wire or another metal wire. The wound coil part 21 may further be cured outside the magnet part 20 by using insulation cement or another connection material, to improve integration degree of the two. In this implementation, the holding assembly 16 that integrates the magnet part 20 and the coil part 21 is formed by winding a wire around the magnet part 20 along the closed loop. In the holding assembly 16 formed in this way, a magnetic field distribution when the coil part 21 is powered on and a magnetic field distribution of the magnet part 20 are basically consistent with each other, and it is easy to control the overall magnetic field of the holding assembly 16 through inverse superposition of magnetic fields of the coil part 21 and the magnet part 20, so as to reliably control a holding force, without affecting a magnetic field impact range after superposition due to a relatively poor magnetic field range overlap between the coil part 21 and the magnet part 20. Optionally, the coil part 21 is defined between an inner circumferential surface 47 and an outer circumferential surface 48 of the arc ring. Specifically, during winding of the wire, the wire is not wound to the inner circumferential surface 47 and the outer circumferential surface 48 of the arc ring In this implementation, a winding range of the coil part 21 is located between the inner circumferential surface 47 and the outer circumferential surface 48 of the arc ring, so that winding of the coil part 21 does not increase a thickness (that is, spacing between the inner circumferential surface 47 and the outer circumferential surface 48) of the magnet part 20, thereby facilitating mounting of the holding assembly 16 and reducing required mounting space. For example, when the bracket 14 is disposed in an embedded manner, the arrangement manner may be implemented only if the bracket 14 has a relatively small wall thickness, and no additional space is occupied. In addition, in the holding assembly 16 of this structure, the coil part 21 does not protrude from the outer circumferential surface 48 of the magnet part 20, and the coil part 21 will not be easily disconnected or leak electricity due to an external force or impact.

For an implementation when there are two holding assemblies 16, one of the two holding assemblies 16 is connected to the seat frame 22, the other is connected to the cover 23, and when the cover 23 and the seat frame 22 are combined, the two holding assemblies 16 are enclosed into a ring that communicates with the accommodating space 18 in an axial direction, to allow the stylus 11 to penetrate. In this implementation, the two holding assemblies 16 are separately mounted on the seat frame 22 and the cover 23, and are enclosed into a ring that communicates with the accommodating space 18, to allow the stylus 11 to penetrate, and the stylus 11 is separately held from two sides. The holding assembly 16 may be integrally embedded in a position corresponding to the seat frame 22/cover 23, or may be connected to the seat frame 22/cover 23 in a manner such as bonding or clamping.

In this embodiment, the held element 56 of the stylus 11 may be disposed on an outer circumference of the stylus 11 or inside the stylus 11.

In this embodiment, the stylus receiving apparatus 13 includes a power supply apparatus 53 (refer to FIG. 12), configured to supply power to the coil part 21 and/or the sensing assembly 17. A power supply mode of the power supply apparatus 53 is battery power supply or wireless power supply. In this implementation, the stylus receiving apparatus 13 is supplied power by additionally providing a battery for the stylus receiving apparatus 13 or by using a device power supply of the electronic device 10 in a wired or wireless manner.

An embodiment of this application further provides a stylus receiving method. Based on the foregoing stylus receiving apparatus 13, the stylus receiving method includes:

when a stylus 11 needs to be received, inserting the stylus 11 from an exit/entrance port 19, so that the stylus 11 drives an ejection mechanism 15 to change from an unlocked state to a locked state, and is received in an accommodating space 18; in addition, controlling a coil part 21 to be in a power-off state, so that a first magnetic field of a holding assembly 16 holds the stylus 11; and when the stylus 11 needs to be taken out, pressing the stylus 11, so that the stylus 11 drives the ejection mechanism 15 to change from the locked state to the unlocked state; in addition, controlling the coil part 21 to be powered on, so that the holding assembly 16 generates a second magnetic field, and the ejection mechanism 15 easily ejects the stylus 11 from the exit/entrance port 19.

The stylus receiving method in this embodiment of this application is based on the foregoing stylus receiving apparatus 13, which can easily and effectively implement receiving and ejection of the stylus 11, ensure good hand feeling, and improve user experience.

In a possible implementation, a control system 55 receives a state change of the ejection mechanism 15 that is sensed by the sensing assembly 17, and controls, based on the corresponding state change, the coil part 21 to be powered on or powered off. The control system 55 in this implementation may be a main control system of an electronic device 10 in which the stylus receiving apparatus 13 is used. That is, the control of the stylus receiving apparatus 13 for receiving a signal of the sensing assembly 17 and controlling the coil part 21 to be powered on/powered off is implemented by the main control system of the electronic device 10.

Figure 12:
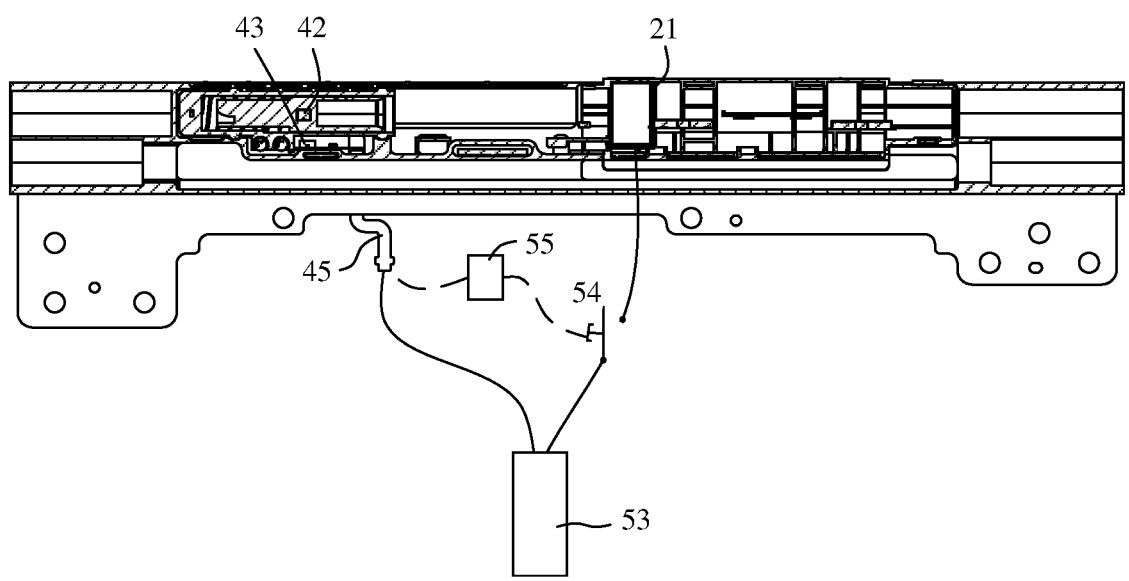
FIG. 12 is a diagram showing a control principle of a stylus receiving apparatus according to an embodiment of this application.

FIG. 12 is a control principle diagram of a stylus receiving apparatus 13 according to an embodiment of this application. Referring to FIG. 12, the power supply apparatus 53 separately supplies power to the Hall element 43 and the coil part 21. In addition, a control switch 54 controls a branch that is used by the power supply apparatus 53 to supply power to the coil part 21 to be connected or disconnected, and the control system 55 is communicatively connected to the Hall element 43 and the control switch 54. With reference to the foregoing description, when in use, and the stylus 11 is inserted to drive the ejection mechanism 15 to change from the unlocked state to the locked state, the Hall element 43 senses the state change, and transmits a signal to the control system 55; and the control system 55 controls the control switch 54 to be turned off, so that the power supply apparatus 53 stops supplying to the coil part 21, and the holding assembly 16 holds the stylus 11. When the stylus 11 is taken out, the ejection mechanism 15 changes from the locked state to the unlocked state, and the elastic member 27 of the ejection mechanism 15 ejects the stylus 11; in this case, the Hall element 43 senses the state change, and transmits a signal to the control system 55; and the control system 55 controls the control switch 54 to be turned on, so that the power supply apparatus 53 supplies power to the coil part 21, and a magnetic field generated by the coil part 21 offsets at least a part of the magnetic field of the magnet part 20, the holding force exerted by the holding assembly 16 on the stylus 11 is reduced, and the elastic member 27 only needs less elasticity to normally eject the stylus 11.

In another implementation, any other suitable method may be used for controlling the coil part 21 to be powered on/powered off.

According to the foregoing description, the stylus receiving apparatus 13, the stylus receiving method, and the electronic device 10 in embodiments of this application have beneficial effects such as reliably holding the stylus 11, better hand feeling in receiving or taking out the stylus 11, and improved user experience.

The foregoing implementation are merely used to describe the technical solutions of this application, but are not limited thereto. Although this application is described in detail with reference to the foregoing preferred implementation, persons of ordinary skill in the art should understand that modification or equivalent replacement of the technical solutions of this application may be performed without departing from the spirit and scope of the technical solutions of this application.

What is claimed is:

1. A stylus receiving apparatus, comprising:
   a bracket, the bracket defining an accommodating space, the accommodating space having an exit/entrance port for inserting a stylus;
   an ejection mechanism, wherein the ejection mechanism is disposed in the accommodating space, and the ejection mechanism is configured to be driven to a locked state by the stylus when the stylus is being inserted into the accommodating space, and configured to be driven to an unlocked state by the stylus when the stylus in the accommodating space is being pressed;
   wherein, in the locked state, the ejection mechanism allows the stylus to be received in the accommodating space; and
   wherein, in the unlocked state, the ejection mechanism is capable of ejecting the stylus from the accommodating space;
   a holding assembly, configured to cooperate with a held element on the stylus, so as to hold the stylus;
   wherein the holding assembly comprises a magnet part and a coil part;
   wherein the holding assembly generates a first magnetic field when the coil part is powered off;
   wherein the holding assembly generates a second magnetic field when the coil part is powered on; and
   wherein a holding force exerted by the second magnetic field on the stylus is smaller than a holding force exerted by the first magnetic field on the stylus; and
   a sensing assembly;
   wherein the sensing assembly is communicatively connected to the coil part;
   wherein the sensing assembly senses a state change of the ejection mechanism by sensing movement of the ejection mechanism, the coil part is powered off when the sensing assembly senses that the ejection mechanism changes from the unlocked state to the locked state; and wherein the coil part is powered on when the sensing assembly senses that the ejection mechanism changes from the locked state to the unlocked state, wherein the ejection mechanism comprises a sliding seat, a sliding member, an elastic member, and a guide rod;

wherein the sliding seat is fixedly connected to the bracket, and is located in the accommodating space;

wherein the sliding member may slidably cooperate with the sliding seat, and a sliding direction is along an axial direction of the accommodating space;

wherein the sliding member comprises a guide plate with a guide groove:

wherein the elastic member is elastically supported between the sliding seat and the sliding member, and can exert an elastic force on the sliding member in a direction toward the exit/entrance port;

wherein the guide rod comprises a fastened end and a movable end, the fastened end and the sliding seat are relatively fastened, and the movable end can movably cooperate with the guide groove, and can move along the guide groove when the sliding member is driven by the stylus to move relative to the sliding seat;

wherein the guide groove comprises a first locked position and a second locked position that are spaced along the axial direction of the accommodating space;

wherein, in the locked state, the movable end is located in the first locked position, and the guide rod pulls the sliding member, so that the sliding member is limited to a position that is relatively far away from the exit/entrance port, and compresses the elastic member; and wherein, in the unlocked state, the movable end is located in the second locked position, and the sliding member is ejected by the elastic member to a position closer to the exit/entrance port.

2. The stylus receiving apparatus according to claim 1, wherein the magnet part is in a shape of an arc ring, the arc ring comprising an inner circumferential surface and an outer circumferential surface that are radially opposite from one another, a first axial end surface and a second axial end surface that are axially opposite from one another, and a first arc end surface and a second arc end surface that are arch-wise opposite from one another; and wherein the first axial end surface, the first arc end surface, the second axial end surface, and the second arc end surface are sequentially connected end-to-end to form a closed loop, wherein the coil part is formed by winding a wire around the magnet part along the closed loop, and the coil part can be powered on to generate a magnetic field opposite to a magnetic field of the magnet part.

3. The stylus receiving apparatus according to claim 2, wherein
the coil part is defined between an inner circumferential surface and an outer circumferential surface of the arc ring.

4. The stylus receiving apparatus according to claim 2, further comprising a plurality of holding assemblies;
wherein the plurality of holding assemblies is distributed along a circumferential direction, and the plurality of holding assemblies is enclosed into a ring that communicates with the accommodating space in an axial direction, to allow the stylus to penetrate the ring.

5. The stylus receiving apparatus according to claim 1, wherein the sensing assembly comprises a magnetic member and a Hall element;

wherein the magnetic member is disposed in the ejection mechanism, and is configured to be displaced with a change of the ejection mechanism between the locked state and the unlocked state; and wherein the Hall element and the bracket are relatively fastened to each other, and are configured to sense displacement of the magnetic member.

6. The stylus receiving apparatus according to claim 1, further comprising a power supply apparatus, configured to supply power to the coil part and/or the sensing assembly, wherein a power supply mode of the power supply apparatus is a battery power supply or a wireless power supply.

7. The stylus receiving apparatus according to claim 1, wherein the bracket comprises a seat frame and a cover;

wherein the cover is detachably connected to the seat frame, to be enclosed into the accommodating space; and wherein, when the cover is detached from the seat frame, the accommodating space is opened.

8. The stylus receiving apparatus according to claim 7, further comprising two holding assemblies, wherein the two holding assemblies are in a shape of a semicircular ring;

wherein one of the two holding assemblies is connected to the seat frame another of the two holding assemblies is connected to the cover; and wherein, when the cover and the seat frame are combined, the two holding assemblies are enclosed into a ring that communicates with the accommodating space in an axial direction, to allow the stylus to penetrate the ring.

9. The stylus receiving apparatus according to claim 1, wherein the sliding member further comprises a sleeve, the sleeve being connected to an end of the guide plate near the exit/entrance port, and being configured to adapt the stylus.

10. The stylus receiving apparatus according to claim 9, further comprising a step surface between the guide plate and the sleeve;

wherein the elastic member is a helical spring, the elastic member sleeved outside the guide plate; and wherein an end of the elastic member abuts against the step surface.

11. The stylus receiving apparatus according to claim 9, wherein a mounting groove is disposed on the sleeve;

the sensing assembly comprises a magnetic member and a Hall element, and the magnetic member is disposed in the mounting groove; and the Hall element and the bracket are relatively fastened, and can sense displacement of the magnetic member.

12. The stylus receiving apparatus according to claim 1, wherein the accommodating space of the bracket has a positioning ring groove that is spaced along an axial direction, a corresponding ring-shaped protrusion is disposed on an outer circumferential surface of the sliding seat, and the ring-shaped protrusion is adapted to a corresponding positioning groove; and a connection convex lug is further disposed on a side surface of the sliding seat, and the sliding seat is fixedly connected to the bracket by using the connection convex lug.

13. A stylus receiving method, applied to a stylus receiving apparatus, the stylus receiving apparatus comprises:
- a bracket, wherein the bracket defines an accommodating space, and the accommodating space has an exit/entrance port for inserting a stylus; an ejection mechanism;
- wherein the ejection mechanism is disposed in the accommodating space, and the ejection mechanism is configured to be driven to a locked state by the stylus when the stylus is being inserted into the accommodating space and configured to be driven to an unlocked state by the stylus when the stylus in the accommodating space is being pressed;
- wherein, in the locked state, the ejection mechanism allows the stylus to be received in the accommodating space; and
- wherein, in the unlocked state, the ejection mechanism is capable of ejecting the stylus from the accommodating space;
- a holding assembly, configured to cooperate with a held element on the stylus, so as to hold the stylus;
- wherein the holding assembly comprises a magnet part and a coil part;
- wherein the holding assembly generates a first magnetic field when the coil part is powered off;
- wherein the holding assembly generates a second magnetic field when the coil part is powered on; and
- wherein a holding force exerted by the second magnetic field on the stylus is smaller than a holding force exerted by the first magnetic field on the stylus; and
- a sensing assembly;
- wherein the sensing assembly is communicatively connected to the coil part; the sensing assembly senses a state change of the ejection mechanism by sensing movement of the ejection mechanism, the coil part is powered off when the sensing assembly senses that the ejection mechanism changes from the unlocked state to the locked state;
- wherein the coil part is powered on when the sensing assembly senses that the ejection mechanism changes from the locked state to the unlocked state;
- and wherein the stylus receiving method comprises:
- when the stylus needs to be received, inserting the stylus from the exit/entrance port, so that the stylus drives the ejection mechanism to change from the unlocked state to the locked state, and is received in the accommodating space; and controlling the coil part to be in a power-off state, so that a first magnetic field of the holding assembly holds the stylus; and
- when the stylus needs to be taken out, pressing the stylus, so that the stylus drives the ejection mechanism to change from the locked state to the unlocked state; and controlling the coil part to be powered on, so that the holding assembly generates a second magnetic field, and the ejection mechanism ejects the stylus from the exit/entrance port,
- wherein the ejection mechanism comprises a sliding seat, a sliding member an elastic member and a guide rod;
- wherein the sliding seat is fixedly connected to the bracket, and is located in the accommodating space;
- wherein the sliding member may slidably cooperate with the sliding seat, and a sliding direction is along an axial direction of the accommodating space;
- wherein the sliding member comprises a guide plate with a guide groove;
- wherein the elastic member is elastically supported between the sliding seat and the sliding member, and can exert an elastic force on the sliding member in a direction toward the exit/entrance port,
- wherein the guide rod comprises a fastened end and a movable end, the fastened end and the sliding seat are relatively fastened, and the movable end can movably cooperate with the guide groove, and can move along the guide groove when the sliding member is driven by the stylus to move relative to the sliding seat;
- wherein the guide gr pove comprises a first locked position and a second locked position that are spaced along the axial direction of the accommodating space;
- wherein, in the locked state, the movable end is located in the first locked position, and the guide rod pulls the sliding member, so that the sliding member is limited to a position that is relatively far away from the exit/entrance port, and compresses the elastic member; and
- wherein, in the unlocked state, the movable end is located in the second locked position, and the sliding member is ejected by the elastic member to a position closer to the exit/entrance port.

14. The stylus receiving method according to claim 13, further comprising receiving a state change of the ejection mechanism that is sensed by the sensing assembly, and controlling, based on the state change, the coil part to be powered on or powered off.

15. An electronic device, comprising:
- a stylus, wherein a held element is disposed on the stylus; and
- a device body, wherein the device body comprises a stylus receiving apparatus comprising:
- a bracket, wherein the bracket defines an accommodating space, and the accommodating space has an exit/entrance port for inserting a stylus;
- an ejection mechanism; wherein the ejection mechanism is disposed in the accommodating space, and the ejection mechanism is configured to be driven to a locked state by the stylus when the stylus is being inserted into the accommodating space and configured to be driven to an unlocked state by the stylus when the stylus in the accommodating space is being pressed;
- wherein, in the locked state, the ejection mechanism allows the stylus to be received in the accommodating space; and
- wherein, in the unlocked state, the ejection mechanism is capable of ejecting the stylus from the accommodating space;
- a holding assembly, configured to cooperate with a held element on the stylus, so as to hold the stylus; wherein the holding assembly comprises a magnet part and a coil part;
- wherein the holding assembly generates a first magnetic field when the coil part is powered off;
- wherein the holding assembly generates a second magnetic field when the coil part is powered on; and
- wherein a holding force exerted by the second magnetic field on the stylus is smaller than a holding force exerted by the first magnetic field on the stylus; and
- a sensing assembly;
- wherein the sensing assembly is communicatively connected to the coil part;
- wherein the sensing assembly senses a state change of the ejection mechanism by sensing movement of the ejection mechanism, and the coil part is powered off when the sensing assembly senses that the ejection mechanism changes from the unlocked state to the locked state; and wherein the coil part is powered on when the sensing assembly senses that the ejection mechanism changes from the locked state to the unlocked state, and the holding assembly can hold the held element, wherein the ejection mechanism comprises a sliding seat, a sliding member, an elastic member, and a guide rod;

wherein the sliding seat is fixedly connected to the bracket, and is located in the accommodating space;

wherein the sliding member may slidably cooperate with the sliding seat, and a sliding direction is along an axial direction of the accommodating space;

wherein the sliding member comprises a guide plate with a guide groove;

wherein the elastic member is elastically supported between the sliding seat and the sliding member, and can exert an elastic force on the sliding member in a direction toward the exit/entrance port;

wherein the guide rod comprises a fastened end and a movable end, the fastened end and the sliding seat are relatively fastened, and the movable end can movably cooperate with the guide groove, and can move along the guide groove when the sliding member is driven by the stylus to move relative to the sliding seat;

wherein the guide groove comprises a first locked position and a second locked position that are spaced along the axial direction of the accommodating space;

wherein, in the locked state, the movable end is located in the first locked position, and the guide rod pulls the sliding member, so that the sliding member is limited to a position that is relatively far away from the exit/entrance port, and compresses the elastic member, and wherein, in the unlocked state, the movable end is located in the second locked position, and the sliding member is ejected by the elastic member to a position closer to the exit/entrance port.

16. The electronic device according to claim 15, further comprising a device power supply, configured to supply power to the coil part and/or the sensing assembly in a wired or a wireless manner.

\* \* \* \* \*

UNITED STATES PATENT AND TRADEMARK OFFICE
CERTIFICATE OF CORRECTION

PATENT NO. : 12,111,685 B2
APPLICATION NO. : 18/248708
DATED : October 8, 2024
INVENTOR(S) : Xiaoning Yang Page 1 of 1

It is certified that error appears in the above-identified patent and that said Letters Patent is hereby corrected as shown below:

On the Title Page

Change "(71) Applicant: HONOR DEVICE CO., LTD., Guangdong (CN)" to "(71) Applicant: HONOR DEVICE CO., LTD., Shenzhen (CN)";

In the Specification

Column 12, Lines 37 and 38, change "the are ring" to "the arc ring";

In the Claims

Column 15, Claim 1, Line 21, change "moyably" to "movably";

Column 15, Claim 2, Line 2, change "an are ring" to "an arc ring";

Column 15, Claim 2, Line 7, change "first are ring" to "first arc ring";

Column 15, Claim 2, Line 8, change "second are ring" to "second arc ring";

Column 18, Claim 13, Line 5, change "moyably" to "movably"; and

Column 18, Claim 13, Line 9, change "gr pove" to "groove".

Signed and Sealed this
Twelfth Day of November, 2024

Katherine Kelly Vidal
*Director of the United States Patent and Trademark Office*